(12) United States Patent
Culp et al.

(10) Patent No.: US 6,895,897 B1
(45) Date of Patent: May 24, 2005

(54) FLUSH INTERLOCKING SIDEWALL MOUNTED SLAM LATCH

(75) Inventors: Rodney Culp, Oklahoma City, OK (US); Rick Lepa, Yukon, OK (US); Bob Wehling, El Reno, OK (US); Roy Culp, Mustang, OK (US); Danny McLean, Geary, OK (US); Bill Herron, Mustang, OK (US); Danny Osterberger, Yukon, OK (US)

(73) Assignee: Exiss Aluminum Trailers, Inc., El Reno, OK (US)

( * ) Notice: Subject to any disclaimer, the term of this patent is extended or adjusted under 35 U.S.C. 154(b) by 277 days.

(21) Appl. No.: 10/042,838

(22) Filed: Jan. 9, 2002

(Under 37 CFR 1.47)

Related U.S. Application Data

(63) Continuation-in-part of application No. 09/640,594, filed on Aug. 17, 2000.

(51) Int. Cl.⁷ .............................. B60P 3/04; B60P 3/05
(52) U.S. Cl. ...................................... 119/412; 296/24.2
(58) Field of Search ................................ 119/412, 400, 119/516; 296/24.2; 292/194, 32, 33, 34, 341.17, DIG. 30, DIG. 31, DIG. 32, DIG. 63, 108; 70/208

(56) References Cited

U.S. PATENT DOCUMENTS

| | | | | |
|---|---|---|---|---|
| 3,674,303 A | * | 7/1972 | Doonan et al. | 296/24.2 |
| 3,741,529 A | * | 6/1973 | Blagg | 256/26 |
| 3,865,425 A | * | 2/1975 | French | 296/24.2 |
| 3,924,884 A | * | 12/1975 | Christie | 292/196 |
| 3,940,174 A | * | 2/1976 | Mayes | 296/3 |
| 4,010,974 A | * | 3/1977 | Day | 296/24.2 |
| 4,092,044 A | * | 5/1978 | Hoffman | 298/27 |
| 5,174,240 A | * | 12/1992 | Darvill | 119/400 |
| 5,513,595 A | * | 5/1996 | Chatterton | 119/412 |
| 5,887,928 A | * | 3/1999 | Fenske | 296/24.2 |
| 5,934,716 A | * | 8/1999 | Koveal et al. | 292/175 |

OTHER PUBLICATIONS

Photograph of "slam latch" manufactured by Gore Trailers, date unknown.
Photograph of "slam latch" manufactured by Softtouch, date unknown.

* cited by examiner

*Primary Examiner*—Charles T. Jordan
*Assistant Examiner*—Judith A. Nelson
(74) *Attorney, Agent, or Firm*—Martin G. Ozinga; Phillips, McFall, McCaffre, McVay & Murrah, P.C.

(57) ABSTRACT

A slam latch assembly for a trailer having an interior surface defined by a front, a first sidewall, a back, and a second sidewall and the trailer further having a partition with a first end hinged to the trailer first sidewall and a distal end comprising a housing having an interior cavity and an aperture for accessing the cavity wherein the housing is attached to the second sidewall such that the housing is contained in the second sidewall and the aperture is generally flush with the trailer interior surface; and a latching mechanism attached to and contained in the interior cavity of the housing and accessible through the housing aperture wherein the latching mechanism is adapted to selectively secure and release the distal end of the partition.

17 Claims, 5 Drawing Sheets

FIG. 2
FIG. 3
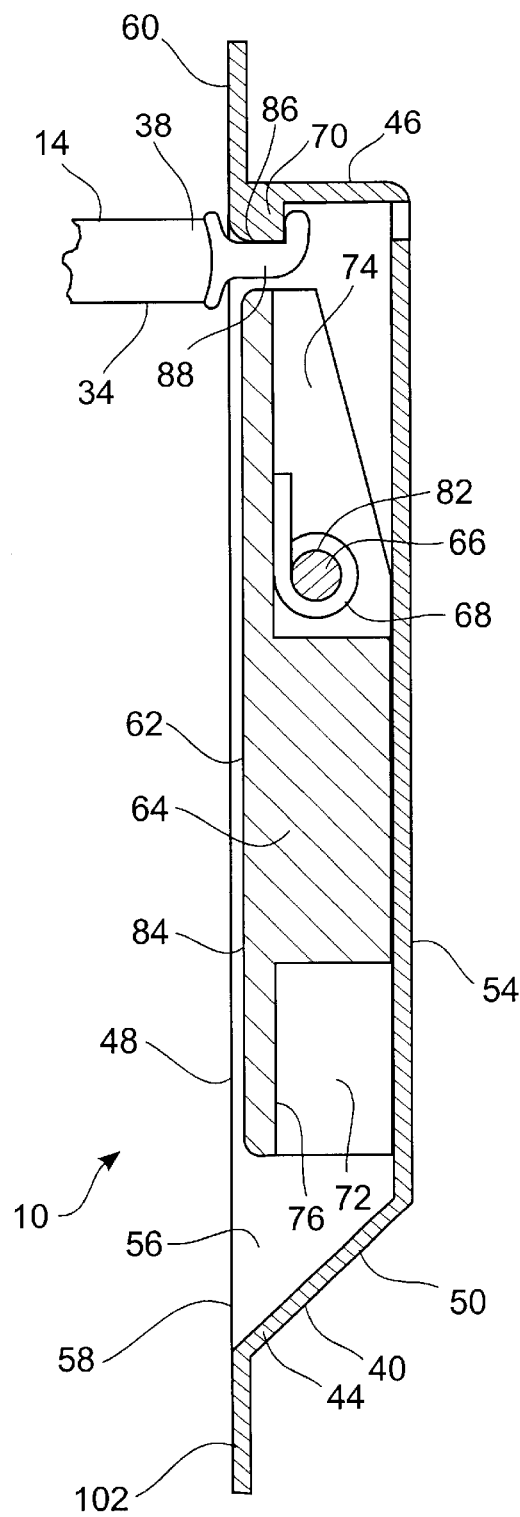
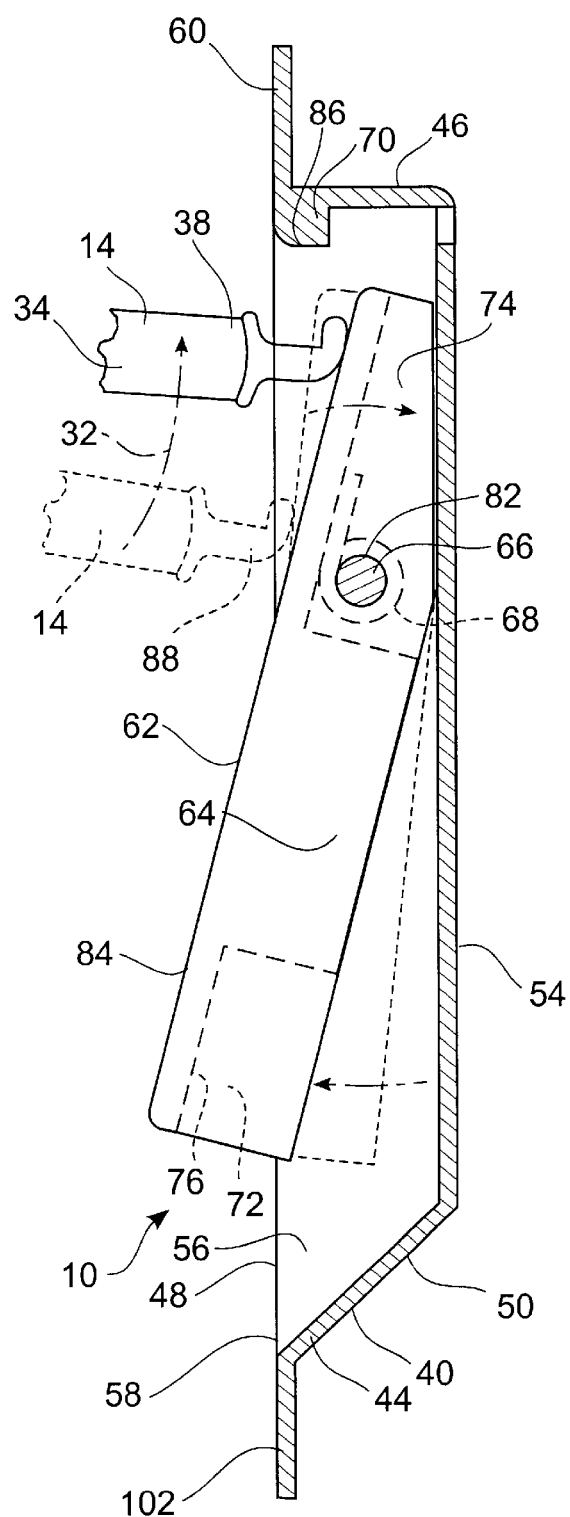

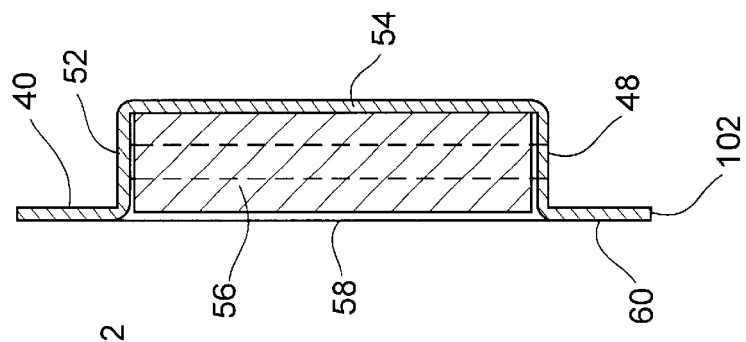
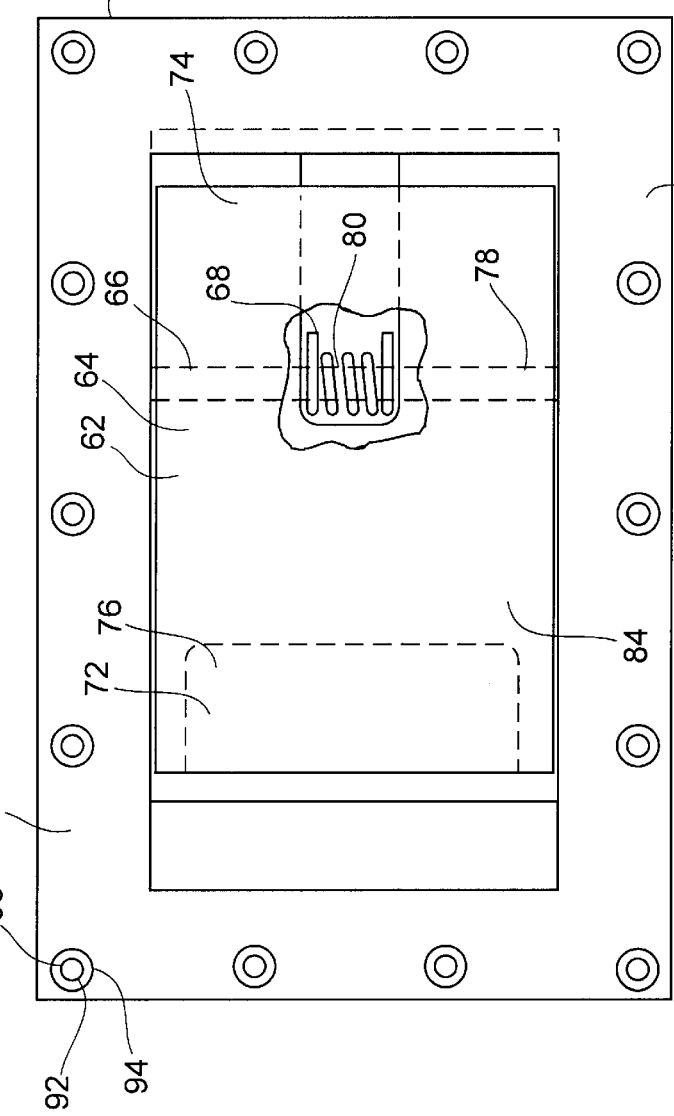

FLUSH INTERLOCKING SIDEWALL MOUNTED SLAM LATCH

CROSS-REFERENCE TO RELATED APPLICATIONS

The present application is a continuation-in-part of U.S. Ser. No. 09/640,594, filed Aug. 17, 2000, entitled "A Flush Interlocking Sidewall Mounted Slam Latch."

BACKGROUND OF THE INVENTION

1. Field of the Invention

The present invention relates to latches for partitions used in livestock trailers and is particularly useful in horse trailers. In general, the present latch is related to devices such as may be used to secure hinged partitions which divide the interior of the horse trailer into a plurality of spaces. More particularly, the present invention relates to slam latches mounted generally flush in the sidewall of the trailer.

2. Description of the Prior Art

Partitions, commonly used in horse trailers, provide many functions including safety, comfort, and the conservation of space. Generally, the partitions are spaced to provide a cubical or stall for a horse to stand which will support the horse and help prevent it from falling or stumbling when the trailer is being moved. In addition, the partitions separate horses in a trailer to reduce the likelihood of one horse injuring another, such as is possible if a horse could kick or stumble into another horse.

It is important that one may quickly, easily, and safely open and close the partitions. This is particularly important when a horse is reluctant to enter the confined space of a trailer or even when a horse is just anxious to exit the trailer. Some prior art partition latches have used spring loaded devices to allow the partition to be closed quickly and easily, but such latches have lacked either the ease of opening or the safety of the latch of the current invention. In general, the prior art spring loaded latches have been either mounted on the partition or on the sidewall of the trailer. The latches mounted on the partition have either exposed the operator's fingers to being injured when operating the latch with one's hand through the partition and the fingers between the horse and the partition, or were difficult to reach and/or operate, especially if the operator was wearing a glove. The latches mounted on the sidewall of the trailer have parts extending into the trailer interior which could injure a horse or snag the operator's clothing and thereby expose the operator to injury. The latch of the current invention is flush mounted in the sidewall of the trailer, thereby avoiding the disadvantages of the prior art devices.

Once the partition is closed, the latch should be secure. It is common for a horse to lean or fall against a partition and push or kick the sidewall of the trailer thereby exerting significant force on the partition's latching mechanism. In some prior art devices the partition is not locked to the sidewall of the trailer and there is the possibility of a horse bowing or bending either the sidewall of the trailer or the partition to release the latch. Other prior art partition latches have used a spring loaded device to hold a partition in place until a pin or other securing device may be applied to lock the partition to the trailer sidewall. The current invention provides a latch which allows the operator to push, or slam, the partition and the latch automatically locks the partition to the sidewall of the trailer thereby eliminating the need for any other locking device.

While it is important that the latching mechanism for a partition is smooth surfaced to prevent scratching or cutting the horse or catching on the operator's clothing, prior art devices have either left openings in the partitions or had parts protruding into the interior of the trailer. The current invention avoids the foregoing disadvantages by providing a flush interlocking sidewall mounted slam latch.

SUMMARY OF THE INVENTION

In view of the foregoing disadvantages inherent in the known types of latches now present in the prior art, the present invention provides a sidewall mounted slam latch construction wherein the same can be utilized reliably in those situations where dependability, safety, and improved latches are desired. As such, the general purpose of the present invention, which will be described subsequently in greater detail, is to provide a new and improved sidewall mounted slam latch which has all the advantages of the prior art devices and none of the disadvantages.

To attain this, the present invention essentially comprises a housing insert which fits into the interior sidewall of a trailer generally flush with the interior of the trailer. Pivotally connected to the pocket insert is a rocker engagement arm forming a slam latch for receiving and holding the swinging or distal end of a hinged divider partition. The rocker engagement arm is also generally flush with the interior surface of the trailer wall when the partition is in the open or the closed position. A hook may be provided to the tip of the swinging or distal end of the divider partition which engages with and locks to catch on the trailer's interior wall to lock the partition to the trailer's sidewall when the partition is in a closed position. To release the partition, the rocker engagement arm handle is pulled in a direction perpendicular to the trailer wall releasing the end of the partition.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved sidewall mounted slam latch which may be easily and efficiently manufactured and marketed.

It is a further object of the present invention to provide a new and improved sidewall mounted slam latch which is of a durable and reliable construction.

An even further object of the present invention is to provide a new and improved sidewall mounted slam latch which is susceptible to a low cost of manufacture with regard to both materials and labor, and which accordingly is then susceptible to low prices of sale to the consuming public, thereby making such latch economically available to the buying public.

Still another object of the present invention is to provide a new and improved sidewall mounted slam latch which provides all of the advantages of the prior art, while simultaneously overcoming some of the disadvantages normally associated therewith.

Another object of the present invention is to provide a new and improved sidewall mounted slam latch having a generally planer surface to reduce the likelihood of injury to either the horse or the operator from contact with latch components.

Another object of the present invention is to provide a new and improved sidewall mounted slam latch which automatically locks a partition to the sidewall of a trailer to prevent release of the partition by bowing or bending of either the partition or the trailer sidewall.

An even further object of the present invention is to provide a sidewall mounted slam latch with simplified operation and few parts than the prior art.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a partial cross-sectional top plan view of an embodiment of the present invention with a partition in a generally closed position.

FIG. 3 is a partial cross-sectional top plan view of an embodiment of the present invention with a partition shown engaging a preferred embodiment of the latching mechanism and an arc of travel.

FIG. 7 is a side view of an embodiment of the present invention showing a cut away of a locking mechanism in accordance with a preferred embodiment.

FIG. 8 is a general cross-sectional side view of a preferred embodiment of the present invention showing a housing, a flange, and a pin in accordance with a preferred embodiment of the present invention.

DETAILED DESCRIPTION OF THE PREFERRED EMBODIMENTS

Figure 1:
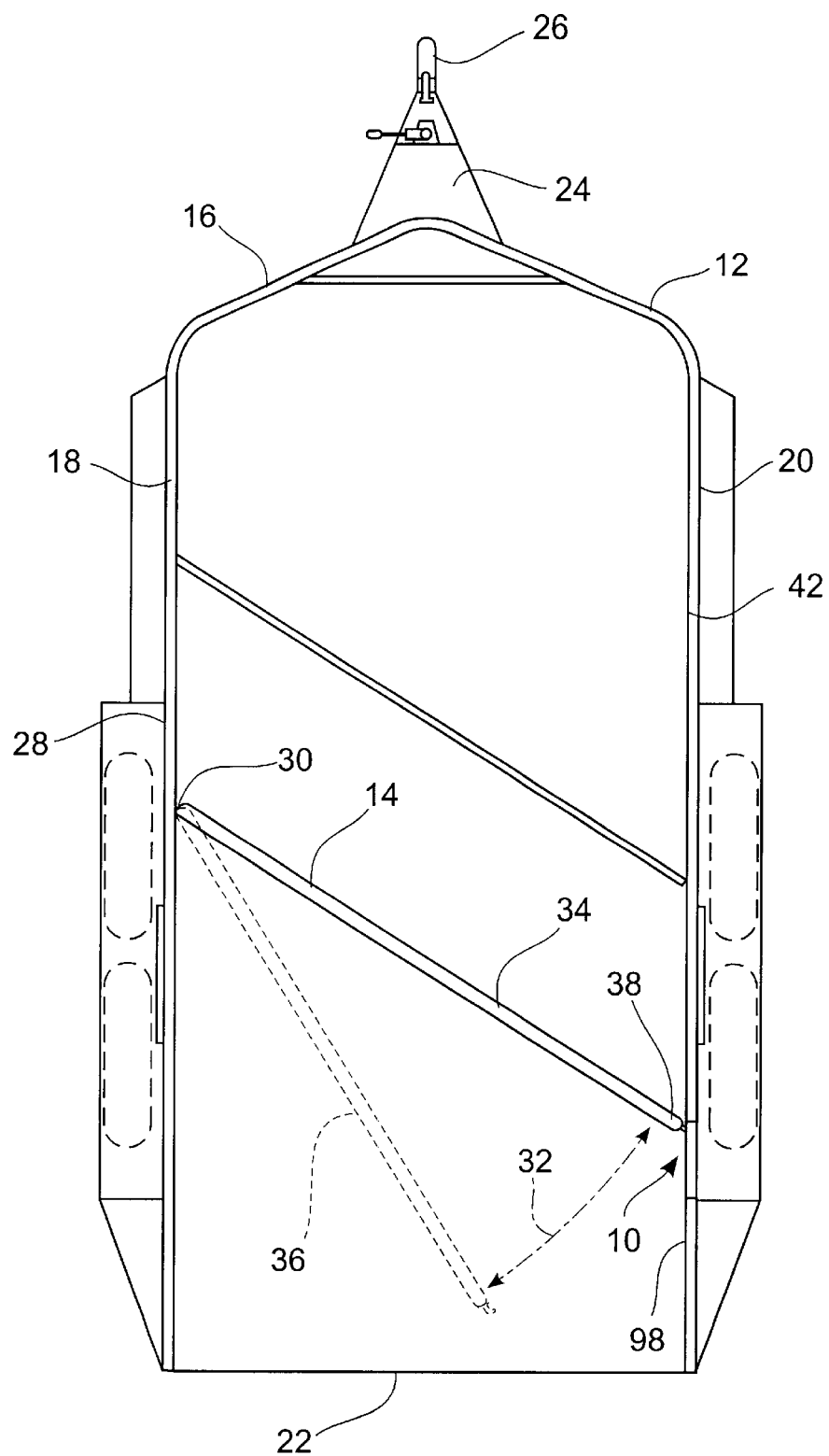
FIG. 1 is a top plan view of a horse trailer with the present invention generally showing a partition in a closed position and arc of travel.
Figure 4:
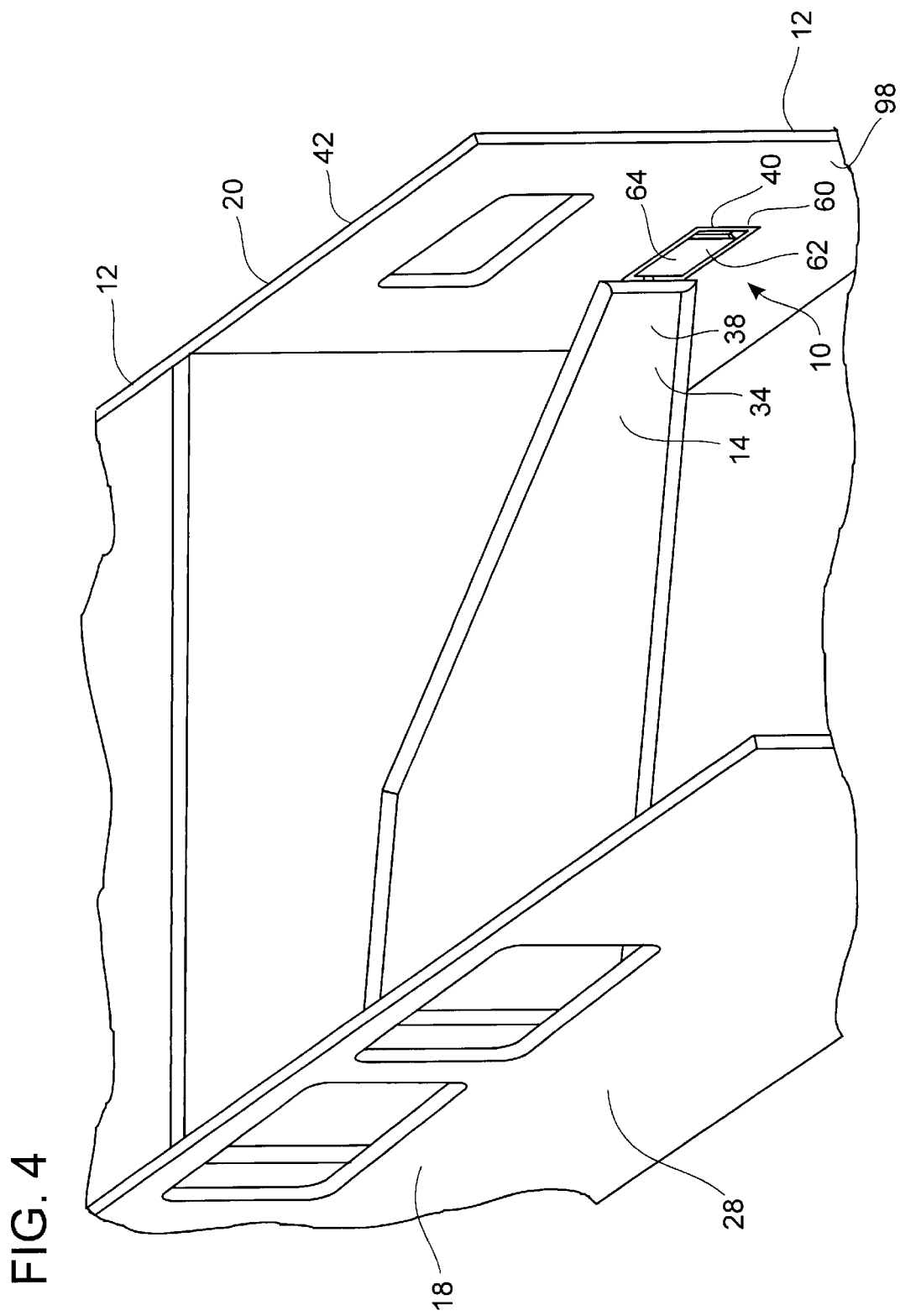
FIG. 4 is a partial cutaway perspective view of an embodiment of the present invention with a partition shown in a generally closed position.
Figure 5:
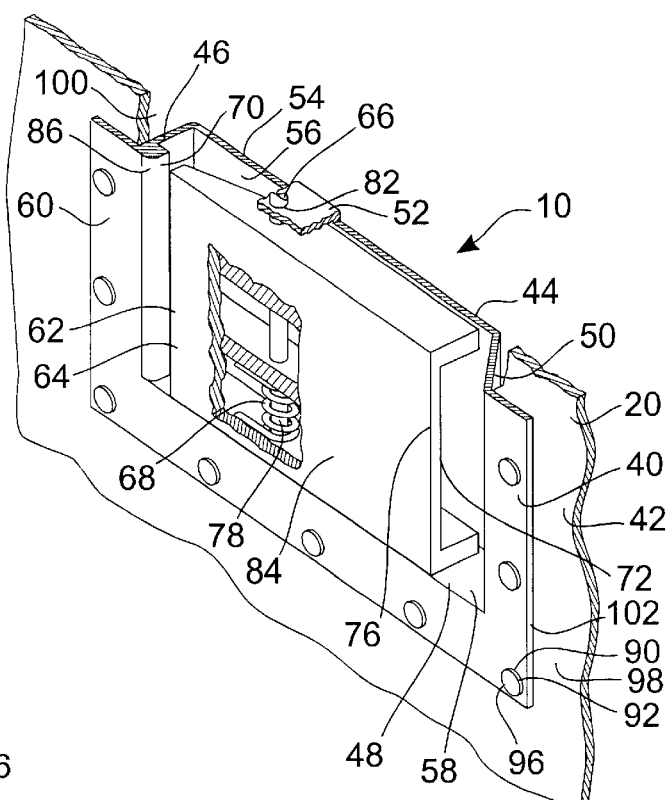
FIG. 5 is a partial cutaway cross-section of a perspective view of an embodiment of the present invention showing a partition in a generally closed position and an arc of travel.

Referring to the drawings in detail and to FIG. 1 in particular, reference character 10 generally designates a sidewall mounted slam latch assembly constructed in accordance with the present invention. Slam latch assembly 10 is generally provided for livestock trailer 12 with one or more hinged partition 14. It is also contemplated that slam latch assembly 10 may further be used in association with other types of livestock partitions not related to trailers such as but not limited to stock pens, barns stalls, and livestock loading ramps.

Trailer 12 generally depicts a typical layout for a small slant load horse trailer and has a front 16, a left side 18, a right side 20, and a rear 22. Trailer 12 front 16 includes means for attaching the trailer 12 to a towing vehicle (not shown), in this case, the trailer 12 includes a tongue 24 with a hitch 26 and often further include additional amenities such as dressing room, saddle rack, storage area, lights, feed doors and bridle racks may also be provided as desired.

It is further contemplated that slam latch assembly 10 may be utilized in larger trailers that commonly utilize a gooseneck hitch in place of the tongue 24 and hitch 26 as shown. It is still further contemplated that the present invention, slam latch assembly 10, can be used in self-propelled vehicles that may have one or more partition 14. It is understood that slam latch assembly 10 may be used with a plurality of partitions 14 in livestock carriers and the illustrations depicting a preferred embodiment should not be considered to be limiting. It is still further understood that the arrangement of partition 14 in trailer 12 may be of various and numerous configurations and the depicted embodiment is for purposes of illustration.

As generally depicted in the illustration, partition 14 is hingedly mounted to trailer 12 first sidewall 28 such as left side 18 by one or more hinges 30. In this way, partition 14 may generally pivot along arc 32 such that partition 14 may be in a closed position 34 or in an open position 36. Partition 14 has sufficient length and is located along the right side 20 such that when the partition 14 is in the closed position 34, a distal end 38 of the partition 14 is held in place by the slam latch assembly 10 which will be discussed in greater detail below.

When partition 14 is in closed position 34, partition 14 distal end 38 interlocks with the slam latch assembly 10 to lock partition 14 to the trailer 12 right side 20. In this way, slam latch assembly 10 prevents partition 14 from moving along arc 32 and prevents trailer 12 left side 18 or right side 20 from being pushed, bowed, or bent away such that partition 14 is released from the closed position 34. In addition, this interlocking generally adds structural strength to trailer 12 left side 18 right side 20, partition 14, and to the trailer 12, in general.

While the partition 14 may contact trailer 12 right side 20 generally perpendicularly, a preferred embodiment of partition 14 is such that it is long enough to contact the right side 20 at an angle such as generally depicted in the illustrations. It should be noted that the partition 14 may be mounted in a reverse manner so that it is hingedly connected to trailer 12 right side 20 and latched on trailer 12 left side 18. It should also further be noted that partition 14 may have numerous angles of contact in different preferred embodiments while in closed position 34 and as such a preferred embodiment is depicted for purposes of illustration but should not be considered limiting.

Once again referring to the drawings and FIGS. 2 through 8, in a preferred embodiment, slam latch assembly 10 includes a housing 40 installed in trailer 12 second sidewall 42 on right side 20. Housing 40 generally includes walls 44 with a first wall 46, a second wall 48, a third wall 50, a fourth wall 52, and a bottom wall 54 which generally define an interior cavity 56 with an aperture 58. Housing 40 further generally includes a flange 60 around aperture 58 which will be discussed in greater detail below.

Housing 40 is provided to position latching mechanism 62 which generally includes rocker engagement arm 64, pin 66, torsion spring 68 and catch 70. In a preferred embodiment, rocker engagement arm 64 is pivotally mounted within the housing 40 interior cavity 56 on pin 66 with torsion spring 68. Rocker engagement arm 64 is generally biased by torsion spring 68 such that rocker engagement arm 64 is generally planar or flush with the flange 60.

Rocker engagement arm 64 may further include a first recessed area 72 and a second recessed area 74. In a preferred embodiment, first recessed area 72 is generally adapted to form a handle 76 to provide a convenient location for an operator to grasp the rocker engagement arm 64 and release partition 14 which will be discussed in greater detail below. Second recessed area 74 provides a location for torsion spring 68 to be mounted around pin 66 to bias the rocker engagement arm 64.

Figure 6:
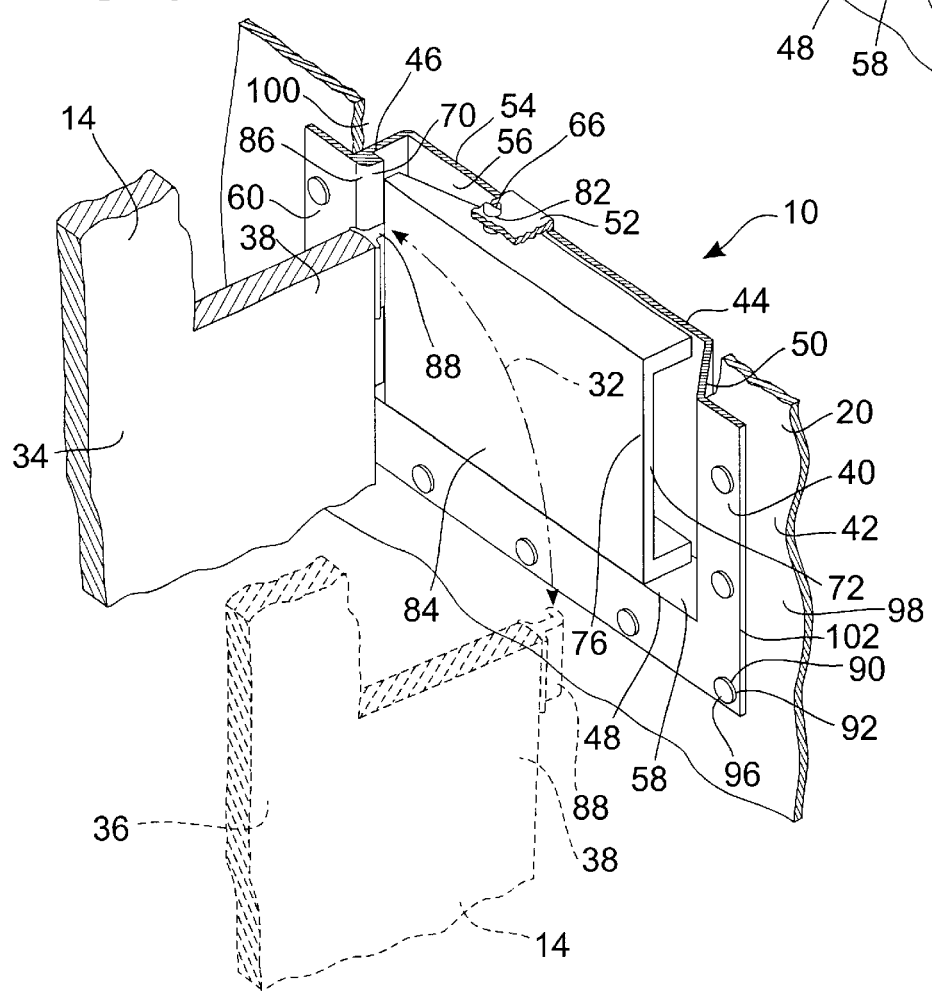
FIG. 6 is a partial cross-section of a perspective view of an embodiment of the present invention showing a cut away of a locking mechanism in accordance with a preferred embodiment.

Such as generally depicted in FIG. 6, in a preferred embodiment, torsion spring 68 is generally located at the bottom 78 of pin 66 so as greater structural integrity may be achieved with possibly less deforming of the housing 40. In another preferred embodiment, torsion spring 68 is generally located in second recessed area 74 in the center 80 of pin 66 as generally depicted in FIG. 7.

In a preferred embodiment, pin 66 is generally vertically oriented in housing 40 and may be secured in housing 40 walls 44 by conventional means such as but not limited to weld, screws, or holes 82 in housing 40 walls 44. It is further contemplated that rocker engagement arm 64 is generally positioned such that outer surface 84 of rocker engagement arm 64 does not protrude past flange 60, but rather is generally planar or flush when partition is in closed position 34 or open position 36. It is realized that rocker engagement arm 64 may slightly protrude when partition 14 is engaging and pivoting rocker engagement arm 64 depending on construction and location of how deep pin 66 is generally positioned relative to housing 40 flange 60 as generally depicted in FIG. 3.

Catch 70 is provided to engage the distal end 38 of partition 14 when partition 14 is in closed position 34. It is further contemplated that housing 40 latching mechanism 62 catch 70 may be incorporated into housing 40 first wall 46. In a preferred embodiment, housing 40 first wall 46 may be formed with a ledge 86 to provide catch 70.

In a preferred embodiment of slam latch assembly 10, partition 14 distal end 38 may further include a hook 88. It is understood that hook 88 may be of various shapes and the depiction in the drawings is for purposes of illustration. The combination of catch 70 and hook 88 serve to lock the partition 14 as generally depicted in FIG. 2 to the latching mechanism 62.

As generally illustrated in FIG. 3, as partition 14 swings along arc 32, partition 14 hook 88 contacts the rocker engagement arm 64 outer surface 84, thus pivoting rocker engagement arm 64 on pin 66 such that torsion spring 68 is flexed.

To lock the partition 14 in the closed position 34, all that is generally required is to push or slam partition 14 along arc 32. Once the hook 88 has passed the rocker engagement arm 64, the rocker engagement arm 64 will spring back into its original biased position locking the partition 14 in a closed position 34. To release the partition 14, one pulls the rocker engagement arm 64 handle 76 into the position generally shown in FIG. 3 by pulling outward. The partition 14 may then be moved to the open position 36.

In another preferred embodiment, housing 40 flange 60 further include attachment means 90 such as but not limited to holes 92 with recesses or beveled sides 94 as generally depicted in FIG. 7. Attachment means 90 may be conventional means such as rivets 96 or screws, bolts, or the like to attach housing 40 to the interior surface 98 of trailer 12 second side wall 42. Of note, attachment means 90 should be of a general construction that leaves a smooth and generally flush result with interior surface 98.

It is contemplated that housing 40 including flange 60 and still further including rocker engagement arm 64 may be made from a synthetic material such as a plastic for acoustic and aesthetic reasons, however, they may also be made from other materials such as aluminum or steel. By using a synthetic material and screwing or riveting housing 40 flange 60 to trailer 12, padding material (not shown) often used in association with trailers 12 may extend under the flange 60. In this way, the flange 60 serves the dual function of securing the housing 40 to the trailer 12 second sidewall 42 and as a trim piece to cover the edges of the padding material.

It is preferred that the housing 40 and accompanying flange 60 are generally flush with trailer 12 second sidewall 42. Of note, since the interior surface 98 of trailer 12 second sidewall 42 is preferably covered with a padding material (not shown), the housing 40 and accompanying flange 60 may actually be slightly recessed into trailer 12 second sidewall 42 due to the compression of the padding material when the slam latch assembly 10 housing 40 is installed. Of course, if no padding material is used housing 40 flange 60 may protrude ever so slightly from the interior surface 98 of trailer 12 second sidewall 42, but in any case the housing 40 should not protrude more than 0.25 inches.

It is further contemplated, housing 40 is installed in a trailer 12 after it has been preassembled as generally shown in FIG. 7. A hole 100 may be cut or provided in the interior surface 98 of trailer 12 second sidewall 42 for generally positioning housing 40. The hole 100 should be slightly larger than housing 40 and smaller than the flange 60 outer edge 102. The housing 40 is then inserted into hole 100 so that housing 40 flange 60 and accompanying rocker engagement arm 64 outer surface 84 are generally planar or flush with interior surface 98 of trailer 12 second sidewall 42. Hook 88 may be provided or attached to partition 14 distal end 38 to complete the slam latch assembly 10.

It is still further contemplated that trailer 12 second sidewall 42 may be of a construction where housing 40 is integrated into trailer 12 second sidewall 42 and thus eliminating the need for a flange 60 or attachment means 90.

Changes may be made in the combinations, operations, and arrangements of the various parts and elements described herein without departing from the spirit and scope of the invention.

We claim:

1. A slam latch assembly for a trailer having an interior surface defined by a front, a first sidewall, a back, and a second sidewall and said trailer further having a partition with a first end hinged to said trailer first sidewall and a distal end comprising:
   a housing having an interior cavity, a bottom wall and an aperture for accessing said cavity wherein said housing is attached to said second sidewall such that said housing is contained in said second sidewall and said aperture is generally flush with said trailer interior surface; and
   a latching mechanism attached to and contained in said interior cavity of said housing and accessible through said housing aperture, said latching mechanism including an arm having a top surface and a bottom surface with a hinge positioned thereon, said latching mechanism is adapted to selectively secure and release said distal end of said partition wherein said bottom surface of said arm contacts said housing bottom wall when said latching mechanism selectively secures said distal end of said partition.

2. The slam latch assembly of claim 1 wherein said partition distal end further includes a hook for communicating with said latching mechanism.

3. The slam latch assembly of claim 1 wherein said housing further includes a flange for attaching said housing to second sidewall.

4. The slam latch assembly of claim 3 wherein said housing flange further includes a plurality of apertures wherein said housing flange is attached to second sidewall by attachment means through said housing flange plurality of apertures.

5. The slam latch assembly of claim 1 wherein said latching mechanism further includes a spring biased rocker engagement arm pivotally attached to said housing interior cavity.

6. The slam latch assembly of claim 5 wherein said rocker engagement arm is pivotally attached to said housing interior cavity by a pin.

7. The slam latch assembly of claim 6 wherein said rocker engagement arm further includes a handle for selectively releasing said distal end of said partition.

8. The slam latch assembly of claim 2 wherein said housing further includes a catch which communicates with said partition distal end hook and said latching mechanism to further secure said partition to said second sidewall.

9. The slam latch assembly of claim 1 wherein said trailer is a horse trailer.

10. The slam latch assembly of claim 1 wherein said housing and said latching mechanism are made from a synthetic material.

11. The slam latch assembly of claim 10 wherein the synthetic material is plastic.

12. A slam latch assembly for a trailer having an interior surface defined by a front, a first sidewall, a back, and a second sidewall and said trailer further having a partition with a first end hinged to said trailer first sidewall and a distal end comprising, said second sidewall including a housing having a bottom wall:
   a hook attached to said partition distal end;
   a latching mechanism contained in said housing in said second sidewall, said latching mechanism including an arm having a top surface and a bottom surface with a hinge positioned thereon, wherein said latching mechanism is generally flush with said interior surface of said trailer and adapted to selectively secure and release said partition distal end hook; and
   wherein said bottom surface of said arm contacts said housing bottom wall when said latching mechanism selectively secures said partition distal end hook.

13. The slam latch assembly of claim 12 wherein said trailer is a horse trailer.

14. The slam latch assembly of claim 12 wherein said latching mechanism is spring biased to secure said hook.

15. The slam latch assembly of claim 12 wherein said latching mechanism further includes a handle to release said hook.

16. The slam latch assembly of claim 12 wherein said latching mechanism is made from synthetic material.

17. The slam latch assembly of claim 16 wherein the synthetic material is plastic.

* * * * *